United States Patent [19]

McMickle et al.

[11] Patent Number: 4,932,616
[45] Date of Patent: Jun. 12, 1990

[54] BAIL RELEASE MECHANISM FOR A SPINNING FISHING REEL

[75] Inventors: Robert L. McMickle; Bradley J. Benit; Steven L. Grice, all of Spirit Lake, Iowa

[73] Assignee: Berkley, Inc., Spirit Lake, Iowa

[21] Appl. No.: 243,285

[22] Filed: Sep. 12, 1988

[51] Int. Cl.$^5$ ............................................. A01K 89/01
[52] U.S. Cl. ................................................... 242/233
[58] Field of Search ................ 242/84.2 G, 84.2 R, 242/231, 232, 233

[56] References Cited

U.S. PATENT DOCUMENTS

| | | |
|---|---|---|
| 3,233,845 | 2/1966 | Inamura . |
| 3,342,442 | 9/1967 | Brantingson ................ 242/84.2 G |
| 3,946,963 | 3/1976 | Oberg ........................ 242/84.21 R |
| 4,005,832 | 2/1977 | Yamazuki ................... 242/84.21 R |
| 4,095,756 | 6/1978 | Morishita .................... 242/84.2 G |
| 4,098,472 | 7/1978 | Sazaki ......................... 242/84.2 G |
| 4,098,473 | 7/1978 | Sazaki ......................... 242/84.2 G |
| 4,108,392 | 8/1978 | Masclet . |
| 4,109,880 | 8/1978 | Yamasaki et al. ........... 242/84.21 R |
| 4,147,313 | 4/1979 | Sazaki ......................... 242/84.2 G |
| 4,171,108 | 10/1979 | Ishida ......................... 242/84.2 G |
| 4,196,868 | 4/1980 | Puryear et al. . |
| 4,202,508 | 5/1980 | Ishida et al. ................ 242/84.2 G |
| 4,222,534 | 9/1980 | Ishida ......................... 242/84.2 R |
| 4,279,387 | 7/1981 | Morimoto ................... 242/84.2 G |
| 4,337,905 | 7/1982 | Sazuki ......................... 242/84.2 G |
| 4,350,312 | 9/1982 | Masclet . |
| 4,389,027 | 6/1983 | Sazaki et al. ............... 242/84.2 G |
| 4,403,750 | 9/1983 | Morimoto ................... 242/84.2 G |
| 4,427,161 | 1/1984 | Sakumoto ................... 242/84.2 A |
| 4,502,645 | 3/1985 | Sazaki et al. ............... 242/84.2 G |
| 4,535,952 | 8/1985 | Carlsson ..................... 242/84.2 G |
| 4,562,976 | 1/1986 | Ban ............................. 242/84.2 G |
| 4,614,314 | 9/1986 | Ban ............................. 242/84.2 G |
| 4,676,450 | 6/1987 | Carpenter et al. ........... 242/84.2 G |
| 4,705,228 | 11/1987 | Maruyama et al. .......... 242/84.2 G |
| 4,747,559 | 5/1988 | Hitomi ........................ 242/84.2 G |
| 4,848,695 | 7/1989 | Kaneko ....................... 242/232 |

FOREIGN PATENT DOCUMENTS

| | | |
|---|---|---|
| 49-19186 | 5/1974 | Japan . |
| 53-32191 | 3/1978 | Japan . |
| 56101766 | 12/1979 | Japan . |
| 55-036063 | 8/1980 | Japan . |
| 56-101767 | 8/1981 | Japan . |
| 56-157971 | 11/1981 | Japan . |
| 56-157972 | 11/1981 | Japan . |
| 56-157973 | 11/1981 | Japan . |
| 57-189370 | 5/1982 | Japan . |
| 57-31733 | 7/1982 | Japan . |
| 57-46782 | 10/1982 | Japan . |
| 58-08053 | 2/1983 | Japan . |
| 58-22538 | 5/1983 | Japan . |
| 58-70769 | 5/1983 | Japan . |
| 58-70770 | 5/1983 | Japan . |
| 58-146465 | 10/1983 | Japan . |

*Primary Examiner*—Katherine A. Matecki
*Attorney, Agent, or Firm*—Faegre & Benson

[57] ABSTRACT

A bail release mechanism for a spinning fishing reel having a spring guided by a drive shoe having no fixed pivot to drive a bail support arm from an open-bail position to a closed-bail position. A ramp integral with a bearing cover on the reel drives a trip spring in the form of a Z-shaped wire which moves the bail support arm from a near-over-center position past an over-center position to a remote non-over-center position. A sliding drive shoe couples a bias spring to the bail support arm to drive the bail support arm to one of the open and closed positions. A manually operable trigger engages the bail support arm to drive the bail support arm to the open position.

22 Claims, 4 Drawing Sheets

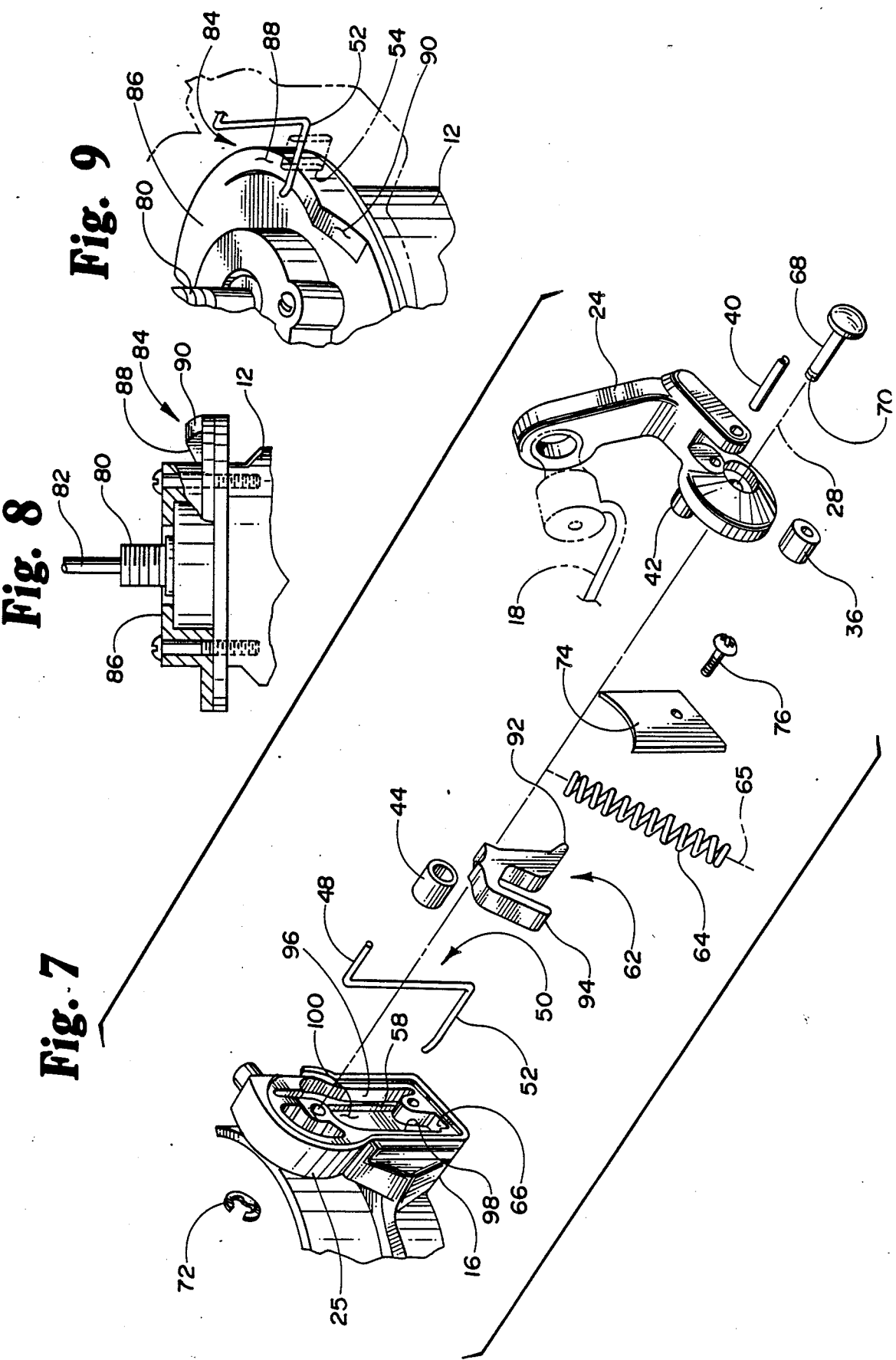

BAIL RELEASE MECHANISM FOR A SPINNING FISHING REEL

FIELD OF THE INVENTION

The present invention relates to a detent mechanism for positioning a wire bail on a spinning fishing reel.

BACKGROUND OF THE INVENTION

In the past, a number of designs of spinning fishing reels have utilized mechanisms to position a wire bail in open and closed positions for permitting line payoff and for causing line rewinding, respectively. Such prior art mechanisms have typically included a relatively large number of parts resulting in increased cost and complexity and may be characterized as having a relatively large spring tension which must be overcome to drive the bail from the open to the closed position resulting in a hard action or "feel" when it is desired to rewind the fishing line on a spool of the fishing reel.

The present invention overcomes deficiencies of prior art devices by providing an improved detent mechanism which has relatively few parts, and which is characterized by a relatively light resisting force to be overcome resulting in an improved "feel" in closing the bail for line rewinding.

BRIEF DESCRIPTION OF THE DRAWINGS

FIG. 7 is an exploded perspective view of a portion of the detent mechanism of this invention.

FIG. 8 is a fragmentary plan view of a partially disassembled reel with parts broken away.

FIG. 9 is a fragmentary perspective view of FIG. 8 and showing a portion of the trip wire means of the present invention and showing a portion of the yoke in phantom.

DETAILED DESCRIPTION

Figure 1:
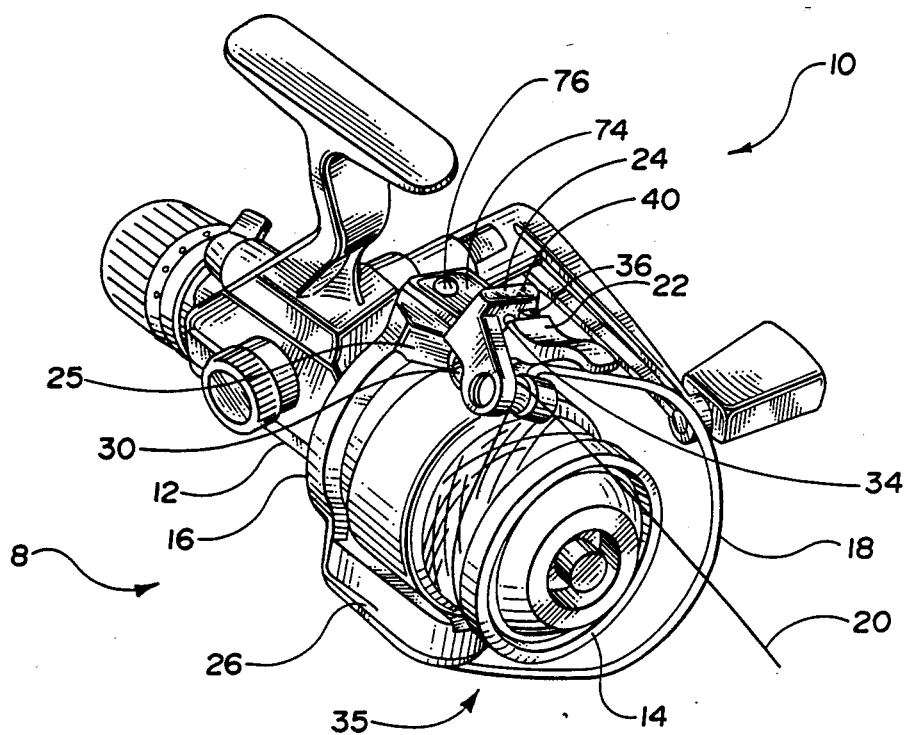
FIG. 1 is a perspective view of a fishing reel having the improved detent mechanism of the present invention with the bail in a closed position.
Figure 2:
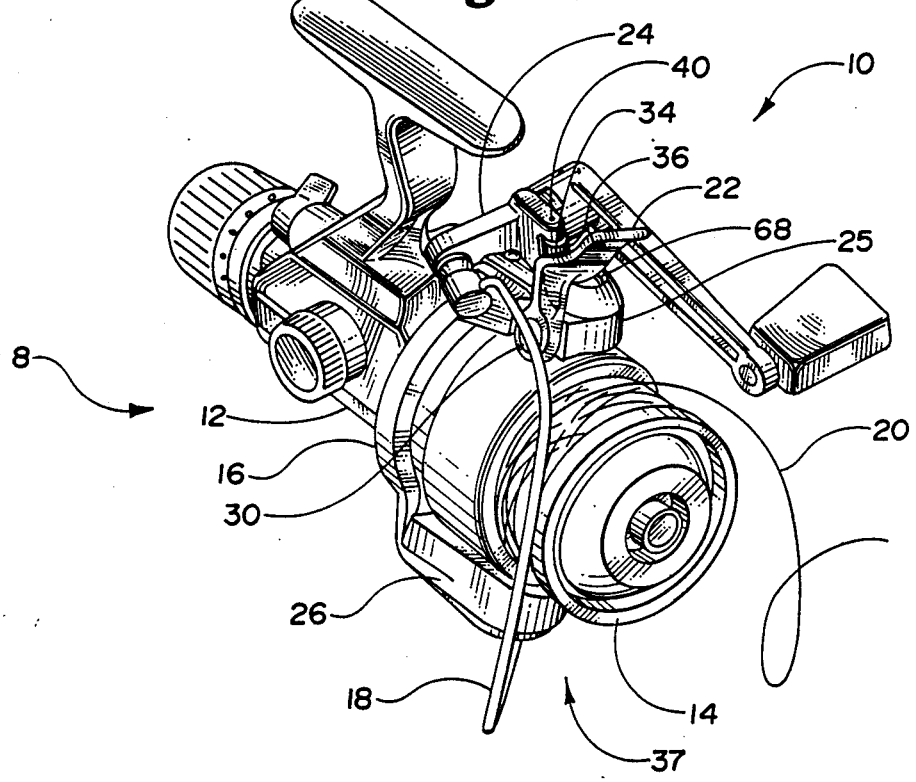
FIG. 2 is a perspective view of the reel of FIG. 1 with the bail in an open position.

Referring now to FIGS. 1 and 2, a fishing reel 8 of the spinning type may be seen. Reel 8 has a frame 12 on which a spool 14 is mounted. A rotatable yoke 16 carries a wire bail 18 shown in a closed position in FIG. 1 and in an open position in FIG. 2. The closed position in FIG. 1 is a line rewinding position where a fishing line 20 is rewound by bail 18 on spool 14. When bail 18 is in the open or line pay off position as shown in FIG. 2, line 20 is free to unwind from spool 14. It is to be understood that when the bail is in the closed position line pay off may also occur, however it will be against the drag acting against rotation of spool 14. When the bail is in the open position, the line 20 may unwind from spool 14 without movement of spool 14. Reel 8 also has a detent mechanism 10 to hold bail 18 in one of the open and closed positions.

Figure 5:
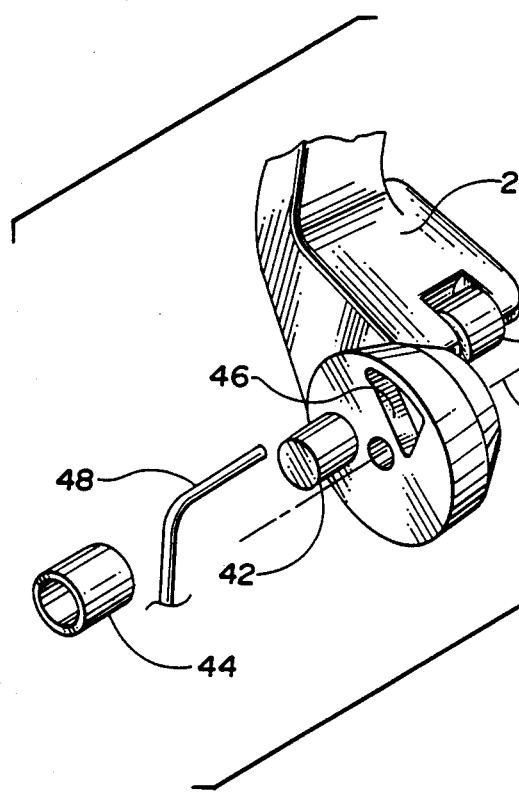
FIG. 5 is a fragmentary perspective exploded view of a portion of a bail support arm and associated elements.
Figure 6:
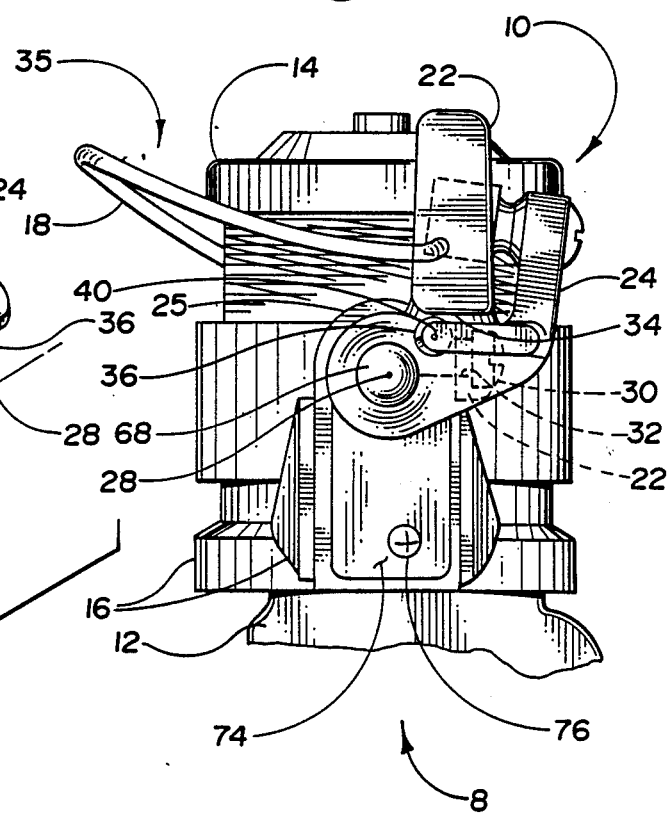
FIG. 6 is a top plan fragmentary view of the reel of FIG. 1 with the bail closed.

Bail 18 may be moved from the closed position of FIG. 1 to the open position of FIG. 2 by actuation of trigger member 22 which operates against a bail support arm 24. Bail support arm 24 pivotably mounts one end of bail 18 to an adjacent portion 25 of yoke 16. The other end of bail 18 is mounted in pivoting relationship with an opposite portion 26 of yoke 16. Bail support arm 24 is pivoted about a fixed pivot or axis 28 (see FIGS. 5 and 6). Bail 18 may be opened and closed manually as well, if desired.

Figure 3:
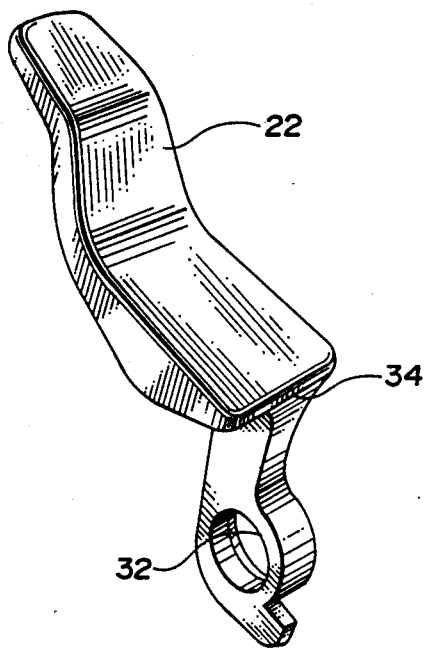
FIG. 3 is a perspective view of one embodiment of a trigger member useful in the practice of this invention.
Figure 4:
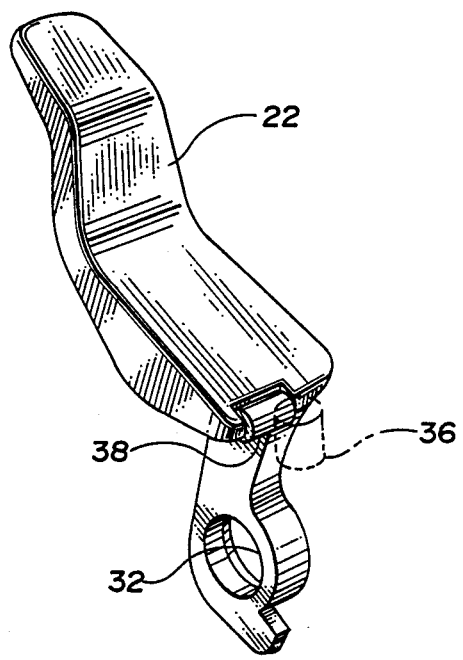
FIG. 4 is a perspective view of an alternative embodiment of a trigger member useful in the practice of this invention.

Referring now also to FIGS. 3-6, trigger member 22 is pivotably or rotatably mounted to yoke 16 by screw 30 located in aperture 32. Trigger member 22 may have a rigid bearing surface 34 to engage a mating rigid bearing surface (not shown) on bail support arm 24 to drive bail support arm 24 from a first bail support arm position 35 to a second bail support arm position 37 as may also be seen in FIGS. 10 and 11. Alternatively, as may be seen in FIG. 5 or 6, a roller may be interposed at the point of engagement between trigger member 22 and bail support arm 24. Referring now more particularly to FIG. 4, in one embodiment trigger member 22 may have a roller 38 mounted thereon in place of rigid bearing surface 34 (as shown in FIG. 3). As may be seen in FIG. 7, bail support arm 24 may alternatively or additionally have a roller 36 mounted thereto by any conventional means such as an axle 40. Referring now again to FIGS. 3-6, in an embodiment having both rollers 36, 38, trigger 22 drives bail support arm 24 through rolling contact between rollers 36 and 38, thus reducing friction and improving the ease of operating trigger 22. It is to be understood, however, that some benefit of reduced friction may be obtained in alternative embodiments using only one roller positioned on either the trigger 22 or the bail support arm 24 with a consequent reduction in cost and complexity. In a still further embodiment, a further reduction in cost and complexity may be achieved by eliminating any roller between trigger 22 and bail support arm 24.

Referring more particularly to FIGS. 3-6, trigger member 22 is mounted on yoke 16 to one side of bail support arm pivot 28 and preferably engages bail support arm 24 on that side of pivot 28, thus avoiding unbalanced loading with consequent mechanical deflection inherent in designs which have a trigger mount on one side of the pivot and a trigger engagement with a support for the bail on the other side of the pivot.

Bail support arm 24 also has a projection 42 (shown most clearly in FIG. 5) which preferably includes a sleeve bearing or roller 44 mounted thereon. Alternatively roller 44 may be omitted from projection 42 if desired, in which case projection 42 is preferably enlarged to the outer diameter of roller 44. Bail support arm 24 further has a recess 46 receiving a first extension 48 of a generally Z-shaped trip wire or trip member 50 as shown in FIG. 7. As may be seen in FIGS. 9, 10, 12 and 13, trip wire 50 further has a second extension 52 projecting through an aperture 54 in yoke 16. Trip wire 50 further has an intermediate portion 56 located in a recess 58 of yoke 16. Recess 58 carries member 50 and connects aperture 54 with an aperture 60 in yoke 16. All of trip wire extensions 48, 52 and intermediate portion 56 of trip wire 50 preferably lie substantially in a plane. Recess 58 and apertures 54 and 60 permit trip wire 50 to slide back and forth in recess 58 as may be seen most clearly in FIGS. 10 and 11. Preferably both the trip wire 50 and trigger member 22 are mounted on yoke 16 to the same side of the bail support arm pivot 28 to reduce or eliminate unbalanced loading and to thereby improve the "feel" of the detent mechanism 10 in operation. Also preferably, the contact between trigger member 22 and bail support arm 24 lies in the same plane as that of trip wire 50 also improving the "feel".

Figure 10:
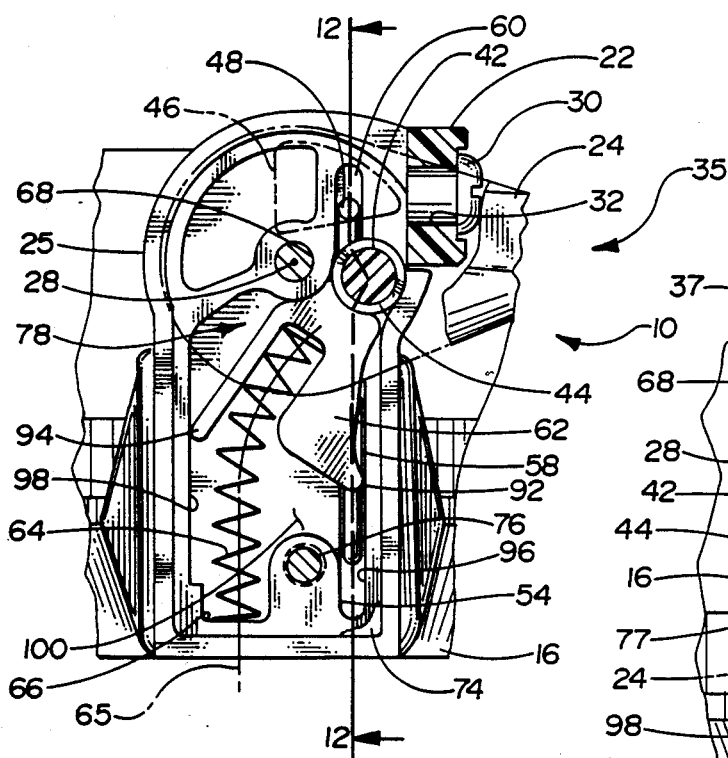
FIG. 10 is a fragmentary top plan detail of the detent mechanism of this invention with some parts cut away and some parts shown in phantom with the detent mechanism in the closed-bail position.
Figure 11:
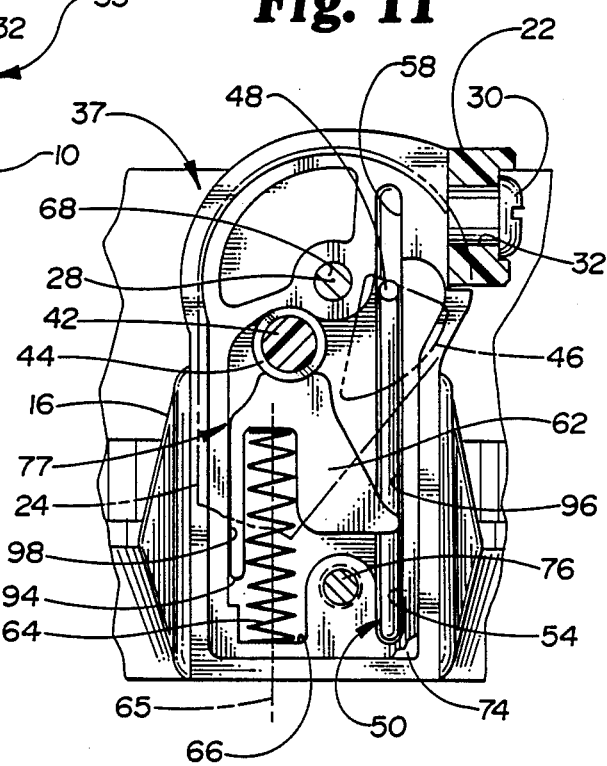
FIG. 11 is a view of the parts of FIG. 10 in the open-bail position.

Referring now to FIG. 7, a drive shoe 62 is urged against bearing 44 by a cylindrical spring 64 (having a principal cylindrical axis 65) which acts against surface 66 of yoke 16. Spring 64 and drive shoe 62 drive bail support arm 24 to one of the two positions shown in FIGS. 10 and 11. FIG. 10 corresponds to the bail-closed or line rewinding position 35 of FIG. 1. FIG. 11 corresponds to the bail-open or line pay off position 37 of FIG. 2. Bail support arm 24 is rotatably mounted on yoke 16 at the fixed pivot 28 by headed axle 69. Axle 68 has a groove 70 which receives retaining ring 72. A cover 74 is secured to yoke 16 by a screw or other fastener 76. FIG. 7 thus shows a portion of detent mechanism 10 having a bail support arm 24 for pivotably mounted the bail 18 about axis 28 between first and second bail positions on the yoke 16, spring 64 for biasing the bail support arm 24 with respect to yoke 16, and drive shoe or bail support arm follower 62 connected or interposed between spring 64 and projection 42 on bail support arm 24 for driving bail support arm 24 selectively toward one of the first and second arm positions 35, 37 (as shown in FIGS. 10 and 11) and away from a range of intermediate positions. The drive shoe 62 does not have any fixed pivot, but is slidingly positionable to a near over-center position 77 as shown in FIG. 11 on a first side of an over-center position (not shown) while the bail support arm 24 is in the second bail support arm position 37, and a remote non-over-center position 78 as shown in FIG. 10 which is on a second side of the over-center position while the bail support arm 24 is in the first bail support arm position 35. Drive shoe 62 slides within portion 25 of yoke 16 to allow controlled deformation of spring 64 away from axis 65 of the cylindrical configuration. FIG. 10 shows spring 64 held in controlled deformation away from axis 65 when bail support arm 24 is in the first bail support arm position 35. FIG. 11 shows spring 64 compressed along cylindrical configuration axis 65 by drive shoe 62 when the bail support arm 24 is in the second bail support arm position 37.

Figure 12:
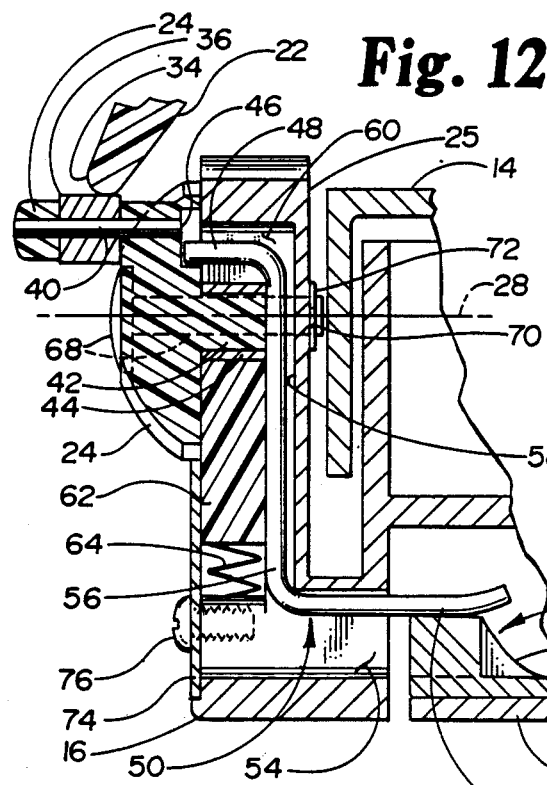
FIG. 12 is a section taken along line 12—12 of FIG. 10.

Referring now to FIGS. 8, 9 and 12, reel 8 has a hollow threaded shaft 80 which rotatably drives yoke 16. Reel 8 also has a reciprocating shaft 82 for reciprocating spool 14 along the axis of shaft 82. Shaft 82 is preferably free to rotate but is not driven, and may have a drag mechanism to retard line pay off with the bail closed. A stationary ramp 84 is secured to frame 12 and is preferably formed as an integral part of a bearing cover 86 for a yoke bearing (not shown) of reel 8. Alternatively, ramp 84 may be formed integral with frame 12. Bearing cover 86 concurrently acts as a shield for the yoke bearing. Ramp 84 is preferably formed of two sloping surfaces 88, 90 and is thus bidirectional.

The operation of detent mechanism 10 is as follows. Referring now again to FIG. 1, with the bail 18 in the closed-bail or line-rewinding position as shown in FIG. 1, trigger member 22 may be grasped and urged to engage bail support arm 24 to drive bail 18 from the line-rewinding to the line-pay off position shown in FIG. 2. Surface 34 (or alternatively roller 38) on member 22 engages bail support arm 24 preferably at roller 36 (see FIGS. 3–5) or at a corresponding rigid surface (not shown). As shown in FIG. 10, bail support arm 24 drives drive shoe 62 against spring 64 through projection 42 and roller 44. In the preferred practice of this invention, spring 64 is permitted to deform or buckle. The degree of deformation or buckling is controlled by drive shoe 62 as shown in FIGS. 10 and 11.

It is to be understood that initially the trigger member 22 is moved against the bail detent mechanism 10 while mechanism 10 is urging bail 18 to the remote non-over-center position 78 corresponding to the first bail support arm position 35 shown in FIG. 1.

As trigger member 22 is rotated, bail support arm 24 rotates about axis 28 past an over-center position which occurs when the axis 28 is in line with the resultant force of spring 64. The over-center condition occurs intermediate the positions 35, 37. As trigger member 22 is further rotated, the detent mechanism 10 moves slightly past the over-center position coming to rest in a near-over-center position 77 on a first side of the over-center position as shown in FIG. 11. In this detent mechanism, drive shoe 62 is not constrained by any pivot, but is guided by first and second projections 92, 94 respectively contacting first and second walls 96, 98 of a detent mechanism cavity 100 in portion 25 of yoke 16. As the detent mechanism 10 is driven to the second position shown in FIG. 11, bail 18 moves to the open-bail or line-pay off position as shown in FIG. 2. Spring 64 is compressed and brought into alignment with the principal cylindrical axis 65 of spring 64. Finally, pivotless drive shoe 62 is urged by biasing spring 64 to hold the bail 18 in an open-bail position (corresponding to the second bail support arm position 37 shown in FIG. 2) while the detent mechanism 10 is in the near-over-center position 77.

Referring now also to FIGS. 8 and 9, when it is desired to move the bail 18 from the open position 37 of FIG. 2 to the closed position 35 of FIG. 1, yoke 16 carrying detent mechanism 10 is rotated, guiding extension 52 of trip wire 50 past sloping surface 88 of ramp 84. The movement of extension 52 is transmitted by intermediate portion 56 to extension 48 of wire 50. As may be seen most clearly in FIGS. 11 and 12, extension 48 of wire 50 drives bail support arm 24 via engagement of extension 48 with recess 46 of bail support arm 24. It is only necessary that trip member 50 urge bail support arm 24 past the over-center position of the detent mechanism since biasing spring 64 will thereafter drive bail support arm 24 to the remote non-over-center position 35 of FIG. 10. Because the mechanism is starting in the near-over-center position 37 (as in FIG. 11) where spring 64 is acting along its axis 65, only light force is required, giving a desirable "feel" to the detent mechanism. Additionally, it is believed that a degree of resiliency in trip member 50 will also improve the "feel" by momentarily storing energy as it slightly deforms in response to ramp 84 before driving detent mechanism 10 past the over-center position. Once the detent mechanism is past the over-center position, spring 64 buckles away from its axis 65, acting through pivotless drive shoe 62 to urge bail support arm 24 to its remote non-over-center position 35 on a second side of the over-center position of the detent mechanism 10 as shown in FIGS. 10 and 1. Thus ramp 84 drives bail support arm 24 from the line-pay off position 37 to the line-rewinding position 35 through the trip wire 50 carried by yoke 16. Since ramp 84 is bidirectional, trip wire 50 will drive bail support arm 24 from the line-pay off to the line-rewinding position for either direction of rotation of yoke 16.

Figure 13:
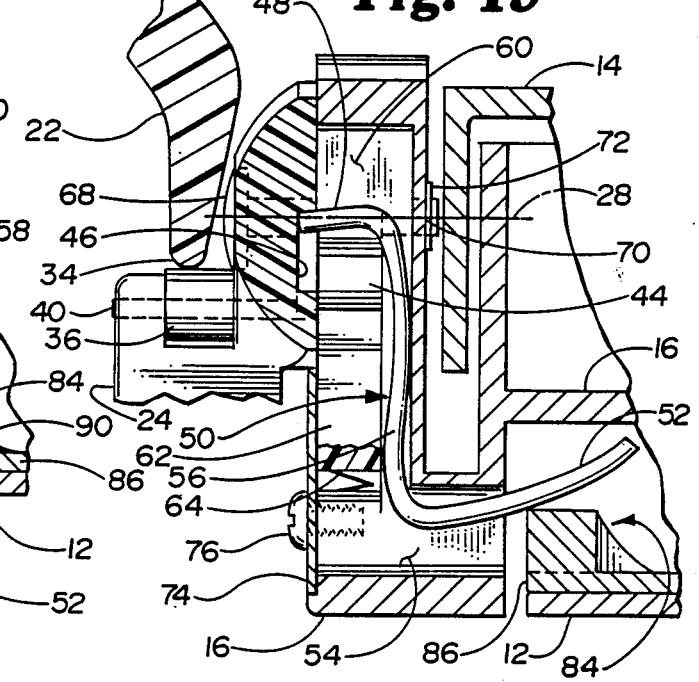
FIG. 13 is a view similar to FIG. 12 with parts in a stressed condition.

A further feature of the detent mechanism is illustrated in FIG. 13. In the event that the bail 18 is forced toward the open-bail position while trip member 50 engages ramp 84, trip member 50 is sufficiently resilient to deform elastically as shown in FIG. 13 to prevent damage. Once bail 18 is released, parts will return to the configuration shown in FIG. 12 and the detent mechanism will remain in the remote non-over-center position 78. As may be seen most clearly in FIGS. 10-12, the sliding drive shoe 62 retains trip wire 50 in yoke 16, while permitting wire 50 to slide in recess 58.

The invention is not to be taken as limited to all of the details thereof as modifications and variations thereof may be made without departing from the spirit and scope of the invention, for example, the first and second positions of the detent mechanism may be interchanged with respect to the open and closed bail positions.

What is claimed is:

1. In a spinning reel of the type having a wire ball mounted on a rotatable yoke for rewinding a fishing line of a spool of the reel and positionable to (i) a first position for rewinding the line on the spool, and (ii) a second position for permitting the line to pay off the spool, a bail detent mechanism comprising:
   (a) bail support arm for pivotably moving the bail between the first and second bail positions on the yoke;
   (b) a spring means for biasing the bail support arm with respect to the yoke;
   (c) a trigger member rotatably mounted on the yoke for driving the bail support arm from the first bail support arm position to the second bail support arm position;
   (d) a roller interposed at the point of engagement between the trigger member and the bail support arm; and
   (e) a drive shoe means connected between the spring means and the bail support arm for driving the bail support arm selectively toward one of a first and second bail support arm positions and away from a range of positions intermediate the first and second bail support arm positions wherein the drive shoe means is characterized by the absence of a fixed pivot and is slidingly positionable to: (i) a near over-center position on a first side of an over-center position while the bail support arm is in the second bail support arm position and (ii) a remote non-over-center position on a second side of the over-center position while the bail support arm is in the first bail support arm position.

2. The detent mechanism of claim 1 wherein the spring means is a compression spring having a right circular cylindrical configuration.

3. The detent mechanism of claim 2 wherein the drive shoe means slides in contact with a plurality of walls of a detent mechanism cavity of the yoke to allow controlled deformation of the spring out of a right circular cylinder and away from an axis of the cylindrical configuration.

4. The detent mechanism of claim 3 wherein the spring is held in controlled deformation away from the axis by the drive shoe means when the bail support arm is in the first bail support arm position.

5. The detent mechanism of claim 4 wherein the spring is compressed along its right circular cylindrical axis by the drive shoe means when the bail support arm is in the second bail support arm position.

6. The detent mechanism of claim 1 wherein the roller is mounted on the trigger member.

7. The detent mechanism of claim 1 wherein the roller is mounted on the bail support arm.

8. The detent mechanism of claim 1, wherein the roller is mounted for rotation on the trigger member, and further comprising and a second roller mounted for rotation on the bail support arm and wherein the trigger member drives the bail support arm through the first and second rollers.

9. The detent mechanism of claim 1 wherein the bail support arm pivots about an axis of rotation and the trigger member is mounted on the yoke to one side of the axis of rotation of the bail support arm and engages the bail support arm on that side of the axis of rotation of the bail support arm.

10. An improved detent mechanism for a spinning fishing reel of the type having a frame and a rotatable bail selectively positionable with respect to the frame for rewinding line on a spool of the reel wherein the bail is mounted on a rotating yoke, the improved detent mechanism for moving the bail between a line-pay off position and a line-rewinding position comprising:
   (a) a bail support arm mounted on the yoke for pivotably moving the bail between the line-pay off and line-rewinding positions;
   (b) a stationary ramp secured to the reel frame;
   (c) a trip member carried by the rotating yoke for tripping the bail from the line-pay off to the line rewinding position, the trip member having a first extension engaging a recess in the bail support arm and a second extension positioned to engage the stationary ramp as the yoke rotates with the bail in the line-payoff position such that the ramp drives the bail support arm from the line-pay off position to the line-rewinding position through the trip member carried by the yoke, and wherein the trip member is sufficiently resilient to elastically deform when the bail is urged toward the line-pay off position while the trip member second extension is in driving contact with the ramp, thereby storing energy and preventing damage to the reel.

11. The improved detent mechanism of claim 10 wherein the stationary ramp is formed as an integral part of the reel frame.

12. The improved detent mechanism of claim 10 further comprising a yoke bearing and bearing cover and wherein the stationary ramp is formed as an integral part of the bearing cover for the yoke bearing of the reel.

13. The improved detent mechanism of claim 12 wherein the bearing cover acts as a bearing shield for the yoke bearing.

14. The improved detent mechanism of claim 10 wherein the trip member comprises a generally Z-shaped member.

15. The improved detent mechanism of claim 14 wherein the trip member is formed of wire.

16. The improved detent mechanism of claim 10 wherein the trip member further comprises means for driving the bail support arm away from the line-pay off position by releasing the stored energy thereof.

17. The improved detent mechanism of claim 10 further comprising a sliding drive shoe means for retaining the trip member in the yoke.

18. The improved detent mechanism of claim 10 wherein the stationary ramp is bidirectional such that the trip member drives the bail support arm from the line-pay off position to the line rewinding position for either direction of rotation of the yoke.

19. The improved detent mechanism of claim 10 further comprising a trigger member for selectively engaging the bail support arm to drive the bail support arm from the line-rewinding to the line-pay off position.

20. The improved detent mechanism of claim 19 wherein the bail support arm is mounted on the yoke at a fixed pivot and both the trip member and the trigger member are mounted on the yoke to the same side of the bail support arm pivot.

21. The improved detent mechanism of claim 20 wherein the trip member lies substantially in a plane.

22. The improved detent mechanism of claim 21 wherein the contact between the trigger member and the bail support arm is in the same plane as the trip member.

* * * * *